United States Patent [19]
Schmidt

[11] Patent Number: 5,619,788
[45] Date of Patent: Apr. 15, 1997

[54] PUNCH HEAD MOUNTABLE IN A PRESS FOR FASTENING BOLTS TO SHEET MATERIAL

[76] Inventor: Dieter Schmidt, Ludwig-Thomas - Str. 2, Lappersdorf D-93138, Germany

[21] Appl. No.: 369,167

[22] Filed: Jan. 5, 1995

Related U.S. Application Data

[63] Continuation-in-part of PCT/EP93/02015, Jul. 29, 1993.

[30] Foreign Application Priority Data

Jul. 31, 1992 [DE] Germany .......................... 42 25 282.2

[51] Int. Cl.⁶ .................................................. B23P 19/00
[52] U.S. Cl. .............................. 29/798; 29/810; 29/809; 221/262
[58] Field of Search ............................. 29/716, 798, 810, 29/822, 809; 227/114, 116, 120; 221/212, 262, 268, 270

[56] References Cited

U.S. PATENT DOCUMENTS

| | | | |
|---|---|---|---|
| 3,114,477 | 12/1963 | Dixon | 221/262 |
| 3,297,199 | 1/1967 | Law | 221/268 |
| 3,971,116 | 7/1976 | Goodsmith et al. | 29/798 |
| 4,200,180 | 4/1980 | Dixon | 221/262 |
| 4,348,796 | 9/1982 | Smallegan | 29/798 |
| 4,574,453 | 3/1986 | Sawdon | 29/798 |
| 5,291,645 | 3/1994 | Aoyama | 29/810 |
| 5,339,983 | 8/1994 | Caple | 221/262 |

FOREIGN PATENT DOCUMENTS

| | | |
|---|---|---|
| 3448219 | 7/1985 | Germany . |
| 3937903 | 5/1991 | Germany . |

*Primary Examiner*—David P. Bryant
*Attorney, Agent, or Firm*—Graham & James LLP

[57] ABSTRACT

In order to achieve a disturbance-free and accurate supply of elements to be conveyed to a metal sheet and/or panel, with a minimum mounting height, a device is disclosed for a tool mounted in a press for fastening bolt-shaped elements, in particular screws, on a metal sheet or panel. The device has a punching head, a fixed member for supplying the elements arranged in opposite rows to the punching head, and a rigid connection between the tappet channel of the punching head and the concatenating station (loading device). A loading bushing acts as a loading device, taking up the elements individually in a fixed orientation and then concatenating them in the head station.

17 Claims, 6 Drawing Sheets

PUNCH HEAD MOUNTABLE IN A PRESS FOR FASTENING BOLTS TO SHEET MATERIAL

This is a continuation-in-part of my copending International Application PCT/EP93/02015, filed Jul. 29, 1993, designating the United States.

The present invention relates to a device for use on a tool mounted in a press for fastening bolt-shaped elements, particularly screws, on a metal sheet, plate or the like.

Devices for fastening bolt-shaped elements, particularly screws, on a metal sheet, plate or the like are known in various fields and are used particularly frequently, in particular, from the standpoint of streamlining, in branches of industry in which sheets and/or plates are shaped and provided with such elements, and particularly with connecting elements. In this connection, it has fundamentally proven advantageous to mount such devices with their so-called punch head on a press in such a manner that, during the course of the following steps which produce the final shape, the element is applied to the metal sheet or plate at a given moment simultaneously with the shaping stroke of the press. The technique of application, whether by riveting and/or punching, is, as such, known.

It is understandable that the so-called punch head, which is fastened in the prior art on the movable press part, which however is not absolutely necessary in the present invention, requires space for its installation, in which connection, in order to obtain the largest possible number of pieces, the press strokes which are carried out during the advance of the metal sheet which, as a general rule, arrives possible. Although the punch heads themselves can be of relatively flat construction, a greater need space results for the entire fastening device due to the fact that the elements to be fastened must be fed to the ram channel of the punch head in a region below the withdrawn ram into a ram channel.

An optimalizing of the structural height would be obtained, in principle, by feeding the elements into the ram channel of the punch head perpendicular to the axis of the ram, in which case, in order to avoid the structural expense, in the case of an older proposal by the applicant, feeding is effected into the immediate region of the ram head by pressure head, i.e. the bolt-shaped elements are fed from a sorting station, for instance, a magnetic vibrating conveyor, to an articulated, suspended two-track rail and taken over from it on their head so that they then slide down the rail under the force of gravity until they come, within the region of the holding-down device of the press, against screws waiting in front of the ram channel for their introduction, and the screws then pass into the ram channel due to the following screw, the screw being subject to the force of gravity, under the action of the so-called pressure head.

This proposal, however, has the disadvantage that, as a result of the dependence of the feed on the pressure head, even very slight disturbances, whether dirt which leads to the jamming of the screws or disturbances occurring in the articulated region of the rail which prevent further sliding of the screws, lead to too low a pressure head in the region of the punch head, as a result of which either no screw at all enters into the ram channel or at least an exact positioning of the screw in the ram channel is not produced, which then, upon the descent of the ram can lead to considerable interference and even destruction on or to the punch head. In addition, a precise positioning of the screws by means of a two-track rail which supports them on their head is extremely difficult if the bottom side of the screw head is structured, since, in such case, an exact resting with the correct angle on the rail is no longer present, which leads to an unaligned positioning in the ram channel which interferes with or even prevents the feeding process.

A method is also known for attaching at least one first workpiece to a second workpiece in a follow-on tool developed as punching and/or shaping tool, as well as such a follow-up tool itself. The object of this known proposal is, in particular, to improve the dimensional accuracy of the workpieces produced, but also to simplify the construction of the tool and/or to improve the dependability in operation of the prior art known up to that time. In this known method, it is provided, among other things, to clamp the second workpiece part between a holding-down device and an opposing element before insertion of the first workpiece part. In this case, there is formed in the tool a punch head by which the first workpiece parts (bolt-shaped elements) are inserted into the corresponding second workpiece part, bolt-shaped elements being fed to the punch head via a rigid feed which is also formed in the tool, namely by a loading device to which the first workpiece parts are fed via an outer feed (tube) on which the workpiece parts are moved by means of a slide into the rigid guide. A transfer in correct position and thus also free of disturbance, of the bolt-shaped elements to the rigid feed is not assured.

There is also known a punching and riveting head for self-punching fastening elements (Federal Republic of Germany 34 48 219) in which the fastening elements are conveyed over an outer feed (tube) to an individualizing device which is arranged to the side of the punching and riveting head and then moved in each case individually by means of a slide on the punching and riveting head. This has the disadvantage, among other things, that the components forming this punching and riveting head are mounted as individual parts on the tool of the press and must be individually removed upon replacement for repair purposes or for converting the press for the working of other parts.

The object of the present invention is to create a device of the aforementioned type which, while having the advantage of a minimum mounting height, permits simplified assembly and simplified replacement of the device.

The present invention provides a device for use on a tool mounted in a press, in which the punch head, the rigid feed, and the loading unit are connected to each other by a rigid connection, preferably a supporting or mounting plate, and thus form a structural unit which can be handled, i.e. mounted or removed, as a whole. In this way, simple mounting and removal is possible, and particularly also simple and rapid replacement of the entire device in case of repair and/or upon conversion of the press or of its tool for the working of other parts, etc. Only by this development of the device as a functional and structural unit which can be mounted as a whole can the special requirements with respect to the rational use of expensive presses, such as used for instance in the manufacture of automobiles, there be taken into account.

By the rigid feed punch head and loading device, a precise, reliable feeding of the elements to the punch head is also assured in the case of the invention, in the manner that the loading device is shifted in space with respect to the punch head and can be provided on the side of the tool. In this way, a low structural height for the device as a whole can be obtained.

In a preferred embodiment of the invention, the loading bushing has a receiving chamber which receives the elements individually and in aligned position. In order to line up the elements head up in the feed, the loading bushing is movable for an advance perpendicular to the axis of the ram and preferably at the same time also for a positioning stroke parallel to the axis of the ram.

In the case of the invention, the feeding of the bolt-shaped elements into the punch head takes place along the rigid feed to one of the counteracting press parts.

"Counteracting press parts" mean in the present connection the parts of the press which act directly or indirectly on the workpiece to be shaped, namely a sheet coming from a coil, another sheet or a plate, for instance the upward and downward moving holding-down device, on the one hand, and the opposing tool which cooperates with it during the shaping process on the other hand, for instance an intermediate plate which is fastened via a clamping plate on the press table.

When reference is had below to "head guidance" there is meant thereby any type of guidance or feeding of the bolt-shaped elements which is effected on the head of the elements. The receiving of the bolt-shaped elements in the receiving chamber of the loading bushing makes it possible for the bolt-shaped elements to be introduced free of disturbance into the rigid feed resting in a row against each other (head against head).

The surprising advantage of the teaching of the invention which can be obtained by simple means resides therein that, while requiring only a particularly small amount of space and with a flat construction, which permit optimal arrangement of the fastening device in a press and thus a particularly simple retrofitting, no relative movement takes place any longer between the punch head of the fastening device and its feed for the elements to be fastened, so that the aforementioned disturbances in feed are definitely avoided.

The aforementioned, particularly advantageous, possibility of aligning with at the same time targeted and aligned feeding of the individual elements up into the ram channel of the punch head, is related to the special loading device of the invention, which can be varied in diversified manner as loading bushing and the alignment thus optimally obtained. This loading bushing which, in a preferred embodiment, is cylinder-actuated, receives the elements, particularly bolt-shaped elements provided with heads, preferably screws, individually fixed in aligned position and arranges them then head against head.

The present invention not only makes possible a compact, flat construction of the fastening device, but this device can also be readily retrofitted on existing presses or stored in them. For this purpose, a rigid connection is proposed between the ram channel and punch head and the aligning point and loading device respectively which can consist preferably of a supporting or mounting plate fastened on the press part bearing the punch head, which plate supports both the loading device and the punch head as well as the conveyor path or feed which extends between the two of them. In this way, there is created a self-contained, compact structural unit which can be handled by itself and can with little re-equipment expense be mounted at any time or also removed for purposes of inspection and which comprises the three essential elements, namely the loading device, which will be described in detail below, which develops in the feed the row of elements for the positive feeding, the punch head, which is basically known but is equipped with the invention, as well as the rigid feed between the two.

The invention makes it possible, in advantageous manner, for the punch head, the rigid feed, and the loading bushing to form a structural unit which can be handled by itself so that a self-contained, and to this extent complete and independent, unit results which needs still only to be connected with supply lines (pneumatic or hydraulic lines) and electric control lines, which the compact manner of construction particularly promotes. This self-enclosed structural unit has the additional advantage that it is possible for it to be installed and operate regardless of its position. As further advantage there may be mentioned the elimination of the mounting and removal work necessary in the prior art in the case of repairs/or maintenance since, in the prior art, at least partial removal had to be effected in these cases in the region of the punch head.

The compact construction is, in particular, also achieved in the manner that the feed of the elements is located on the press part on which the punch head is also fastened, there being fundamentally two possibilities within the invention, namely fastening of the punch head, on the one hand, on the movable press part, for instance the holding-down device, or, on the other hand, on the opposite, fixed press part, for instance on the intermediate plate of the press table or in the region of the cutting insert placed on top thereof. For these two possibilities, the punch head need merely be swung 180°, i.e. in one case it operates upon the attachment of the elements, from above and in the other case from below, it being immovable relative to the foundation in the last-mentioned case.

Independence from the aforementioned pressure head upon the feeding of the bolt-shaped elements is obtained in the invention by a forced feeding of the aligned elements which are arranged one against the other from the point at which this aligning takes place (loading point) up to the ram channel, this forced feeding with the heads of the bolt-shaped elements, each consisting of head and shank, resting against each other being preferably effected by the aligning process (loading). This means that, with each addition of a new element to the row of elements, the row as a whole is pushed by a length equal to the diameter of a head, with the heads of the row of elements resting against each other, in the direction towards the ram channel, i.e. positively fed, so that upon each loading process one element exactly passes into the ram channel of the punch head. The aligning point is the place where the row is assembled, for which there are various possibilities, the ones preferred by the invention being explained below in further detail.

In order to be independent of the geometry of the head of the elements, which is of particular importance in the case of screws which are structured on the bottom of their head, it has been found suitable, within the scope of the invention, to provide a magnetic overhead feed, i.e. the individual elements adhere during the feeding in a row by their heads to a magnetic path, in which connection by "overhead feeding" there is to be understood one in which the elements are fed with their head on top, for instance with punch head arranged in the movable press part; of course, also with the arrangement of the punch head swung 180° in the stationary, lower press part, the heads can also be positively fed on a magnetic path, resting against each other in a row, to the ram channel.

One particular advantage of the invention resides therein that, on the one hand, due to the positive head-against-head conveyance as well as the direct debouching of the feed into the ram channel at a right angle to the axis of the ram, the elements assume their aligned position already in the row, as is necessary in order for them to be driven smoothly into the workpiece, namely aligned in the ram channel and to the ram. Thus, after entrance into the ram channel, no particular aligning of the elements is required any longer, which not only provides the possibility of a higher setting rate per unit of time, but also makes additional inspection and alignment measures in the punch head unnecessary.

Although the magnetic feed, in particular the overhead feed, is fully and completely sufficient for the cases of use customary up to now, it may be advisable, under special conditions, to provide as feed a T-slot feed, for instance if non-magnetic elements, for instance elements of V2A steel, are to be fastened. In this way, at the same time, there is also obtained an additional securing for magnetizable elements, in the manner that they are held against dropping down or falling by the T-slot if, for any reason, either the magnet should fail or an element should not adhere to the magnet due to any external influences. It should be mentioned in this connection that, with the magnetic feed, the individual elements are not only aligned in the ram channel but also enter precisely at the desired height below the ram head. In the case of non-magnetizable elements, the vertical position can be obtained in a simple manner by an oblique surface on a spring-loaded pawl which presses the element in question in the ram channel against the head of the ram.

For punch heads fastened in the lower fixed part of the press, a T-slot feed is equally recommended, it then, in the case of non-magnetizable elements, preventing their tipping over, it being true of both versions that the positive conveyance path or feed is formed preferably by a T-slot provided continuously, aligned from the loading point up to the ram channel. For this purpose permanent magnets are recommended, but electromagnets can, of course, also be used.

The loading bushing of the invention together with its receiving chamber for one element or one screw each consists, for instance, of a block-shaped loading block, it being in one particularly practical embodiment, carriage-guided and cylinder-actuated, namely preferably by at least one first piston-cylinder unit for the feed (feed cylinder). By means of a passage through the loading block which corresponds to the dimensions of one element, it is possible, by targeted movement back and forth—controlled, for instance, by initiators or stops—by means of the first piston-cylinder unit, which is preferably developed as a double-acting piston-cylinder unit, for the elements to be fed one by one to the rigid feed and arranged there in a row, head against head. The feed stroke of the entire row of elements corresponds then in each case to the diameter of the head of the elements. For this purpose, the first piston-cylinder unit or the carriage actuated by it carries out in each case a precisely defined stroke. This is preferably obtained in the manner that the first piston-cylinder unit with its piston rod is supported fixed in position via an abutment which is held on the supporting or mounting plate, while the cylinder is contained in the carriage which bears the loading bushing so that, in this embodiment, upon the action of pressure on the cylinder space facing away from the piston rod, the carriage, with the piston rod held fixed in position moves out in the direction towards the punch head until a piston-side cover which closes off the cylinder space comes against the side of the piston facing away from the piston rod. By suitable action on the cylinder space on the piston-rod side, the carriage is moved back, namely—controlled by at least one initiator—exactly up into the receiving position of the loading bushing.

In the case of a cylinder-actuated loading bushing, a second piston-cylinder unit (positioning cylinder) is preferably provided which moves the loading bushing for a positioning stroke parallel to the axis of the ram. After completion of the feed stroke of the first piston-cylinder unit, the second piston-cylinder unit is actuated, which unit is preferably developed also as double-acting piston-cylinder unit and is preferably connected, namely with its piston rod via a carrier to the loading bushing which is guided on the carriage perpendicular to its direction of movement, while its cylinder is also contained in the carriage. In this way, movement of the loading bushing perpendicular to the feed, i.e. to the longitudinal axis of the acting elements is effected, whereby the loading bushing moves away from the feed in the direction towards the shank of the element, and, controlled via at least one initiator, until the element which is held magnetically and/or mechanically on the feed has moved completely out of the receiving chamber. In this way, even in the case of a receiving chamber in the loading bushing in which the element is in each case guided and held all around, withdrawal of the loading bushing from the corresponding element is possible. Thereupon, the first piston-cylinder unit is moved for the return stroke of the carriage bearing the loading bushing into the rear end position. By reverse action of the second piston-cylinder unit, the loading bushing is then again brought into its receiving position. The loading bushing has then passed over a complete rectangular path, namely with the following four steps:

Targeted, precisely limited feed perpendicular to the said movement until release of the fastening element, return perpendicular to the aforementioned movement rearward movement into the receiving position perpendicular to the above-mentioned movement The invention makes it possible to arrange the double-acting piston-cylinder units which actuate the loading bushing, together with their control and their pneumatic supply lines in a housing into which there need merely be inserted from the outside a known multifunction plug—in the present case for electric and pneumatic supply—so that a perfect, compact structural unit comprising punch head, disturbance-free feed, and loading station which is easy to handle is created.

The feeding of the individual elements to the loading bushing can be effected in known manner from a shooting station in front of which there is arranged a magnetic vibrating conveyor, known per se. In order to achieve here a smooth transfer to the device in accordance with the invention, there is proposed, as preferred embodiment, a coupling receiver having a passage corresponding to the diameter of the head of the elements, which receiver is aligned with the loading bushing or its receiving chamber in the receiving position thereof and is directly or indirectly fastened to the housing via the supporting or mounting plate, which coupling receiver, as a further development of the invention, is adapted to be connected detachably at its free end to a coupling which also has a passage of the same diameter and which preferably serves for connecting of a tube which conducts the elements from said sorting and shooting station.

In order to make certain that an element actually enters into the receiving chamber of the loading bushing as a result of a corresponding pneumatic pressure blow (shot) and thus to avoid having the loading bushing effect an empty stroke, there is placed on the coupling, preferably coaxially, a ring initiator which surrounds the tube and which, upon each passage of an element gives off a corresponding signal to the control movement of the loading bushing, for which control various solutions are known to the person skilled in the art.

In order that, after the loosening of the coupling from the coupling receiver, in which state the coupling is then at the end of the tube, a screw which has been shot does not unintentionally leave the tube and lead to damage or even injuries, the coupling has a barrier which extends into the passage upon the loosening the coupling from the coupling receiver, the barrier consisting preferably of a spring-loaded flap which, in mounted condition, rests on the outside against the passage wall of the coupling receiver and snaps into the passage region of the coupling upon the uncoupling.

As already mentioned, the mounting of the device of the invention can also be swung 180°, in which case the ram of the punch head operates in upward direction, i.e. the bolt-shaped elements are fed with their head downward, which in its turn means that they are, for instance, also shot with their head downward into the loading bushing for the purpose of alignment but, without an additional measure, could drop out of the receiving chamber. For this reason, the invention provides that the loading bushing or its receiving chamber is provided with a clamping device which sees to it that, until the element is transferred to the conveyor path, the element remain in the desired position in the receiving chamber of the loading bushing.

The ram head, the basic construction and manner of operation of which as such are known, has the following special features proposed as part of the invention. For the purpose of the compact construction of the fastening device which is achieved in accordance with the invention, the ram channel of the punch head is contained, at least in part, in the supporting or mounting plate, the punch head preferably consisting of at least two parts which guide the ram, one of which (the top part) is detachably integrated in the supporting or mounting plate, while the other part (the bottom part) is fastened to the top part, each of the two parts having an inner bore which is adapted to the element head, which bores are aligned with each other and form essentially the ram channel. This bipartite character assures, on the one hand, a dependable guidance of the ram and of the element which passes into the ram channel and is then to be inserted into the workpiece by the ram and, on the other hand, easy accessibility, since the lower part can be removed for inspection and maintenance.

In line with the magnetic overhead guidance of the elements (overhead system), in order to secure the correct positioning of each of the elements entering into the ram channel after leaving the conveyor path, the ram is provided on its free end, its head, with at least one magnet which supportingly takes over the element from conveyor path upon the corresponding conveying stroke of the loading bushing.

A direct transfer of each individual element from the conveyor path into the ram channel is obtained, in accordance with the invention, in the manner that the top part and the bottom part are open an amount at least corresponding to the longitudinal cross-sectional dimensions of the element towards the conveyor path, so that each element, without change in its vertical position, passes by sliding from the conveyor path into the ram channel where the magnetic end of the ram head extends precisely at the height of the slide path of the conveyor path into the ram channel, so that an aligned transfer of the elements takes place.

For additional safety and checking of the loading a spring-loaded pin is provided in the top part of the punch head, on its side facing away from the conveyor path, at the height of the plane of the head, which pin extends into the ram channel as soon as an element enters into it and is pressed by the head thereof aligned into the wall against the spring force and, in this connection, activates an initiator which signals the positive loading in correct position. This signal is also processed in known manner and used to control the setting stroke by which the element is pressed into the sheet or plate and/or fastened to it.

Although it is clear from the above description that, as a result of the overhead conveyance in accordance with the invention with the instantaneous advance corresponding precisely to the diameter of the head, an exact positioning of each element aligned in the ram channel is assured upon corresponding actuation of the loading bushing, an additional safety measure is present if, in accordance with another feature of the invention, at least one pawl, which is also spring-loaded, is arranged in the top part at the height of the aforementioned pin which activates the initiator or of the head of the element which is conveyed in each case into the ram channel, which pawl, when the ram channel is empty, also extends into said channel, preferably with its longitudinal axis intersecting the ram channel shifted off-center with respect to the conveyor path and tapers down towards its free end. If now, a conveyor stroke for the loading of the ram channel takes place, the head of the frontmost element of the conveyor path comes into pressure engagement with the oblique surface of the taper of the pawl which faces the conveyor path, as a result of which the pawl is pushed back against the particularly strong spring pressure to such an extent that the element can pass the place of the pawl, whereupon the pawl again springs forward and, with the oblique surface of its taper facing the ram channel, now acts rearward on the head of the element in such a manner that the element is pressed, secured in position, snugly against the opposite ram-channel wall, which is adapted in its shape and size to the radius of the head.

As a further development, each end of the pawl can be pointed and the surface of the pawl which is directed towards the center of the ram can extend back obliquely in the vertical direction in such a manner that it grips below the head of the element present at the time in the ram channel, which is of importance, in particular, in cases in which non-magnetizable elements are used, which elements, although held at the desired height in the T-slot of the conveyor path nevertheless would have no support in longitudinal direction at the time of their entrance into the ram channel due to the lack of magnetic action, but are pressed by said oblique surfaces of the pawl not only against the opposite ram-channel wall but also against the free end of the ram, which then, upon the setting process, pushes the element in the direction towards the open end of the punch head against the oblique surface of the pawl, pressing the latter back.

For pure reasons of additional safety, a plurality of pushers can be provided in the lower part of the punch head, preferably three, arranged 120° apart, which are spring-loaded and extend into the ram channel close to the shank of the element, which pushers, upon proper setting process, are to be sure pressed back into the wall of the punch head by the head of the element which passes by, but in the extremely unlikely case that the element is not properly held against the ram head, prevent the latter from a premature, unintended departure from the ram channel.

The ram movement relative to the punch head is initiated by the press ram with which the end facing away from the punch head is directly or indirectly connected in force-locked manner, preferably by corresponding mounting in the head plate or a stamp-holding plate mounted on it.

For the event that the pressing-in ram of the punch head cannot be precisely adjusted in its starting position relative to the conveyor path via the press ram or its head plate of stamp-holding plate, which may be the case, for instance, in eccentric or crank presses, the invention provided a so-called "plunger version" in which the end of the ram of the punch head which faces away from the ram head is developed as a plunger acted on by compression spring, a guide sleeve being fastened on the punch-head which is connected to the holding-down device, the plunger being mounted and held in the starting position in said guide sleeve under the pressure of the spring against the rear end which permits merely the passage of the piston rod, while the free end of the piston rod is then spaced from the head or stamp-holding plate or the press ram and, upon downward movement of the press ram, comes against it and is pressed or pushed onto the element which is just present in the ram channel until the element is fastened to the sheet or plate. Upon the withdrawal of the press ram, the compression spring then effects the return of the plunger in the guide sleeve precisely into the starting position.

BRIEF DESCRIPTION OF THE INVENTION

Further features of the invention can be noted from the other dependent claims and from the following description of the accompanying drawings, on basis of which preferred embodiments of the invention will be described. In the drawings:

METHODS FOR THE REDUCTION TO PRACTICE OF THE INVENTION

Figure 1:
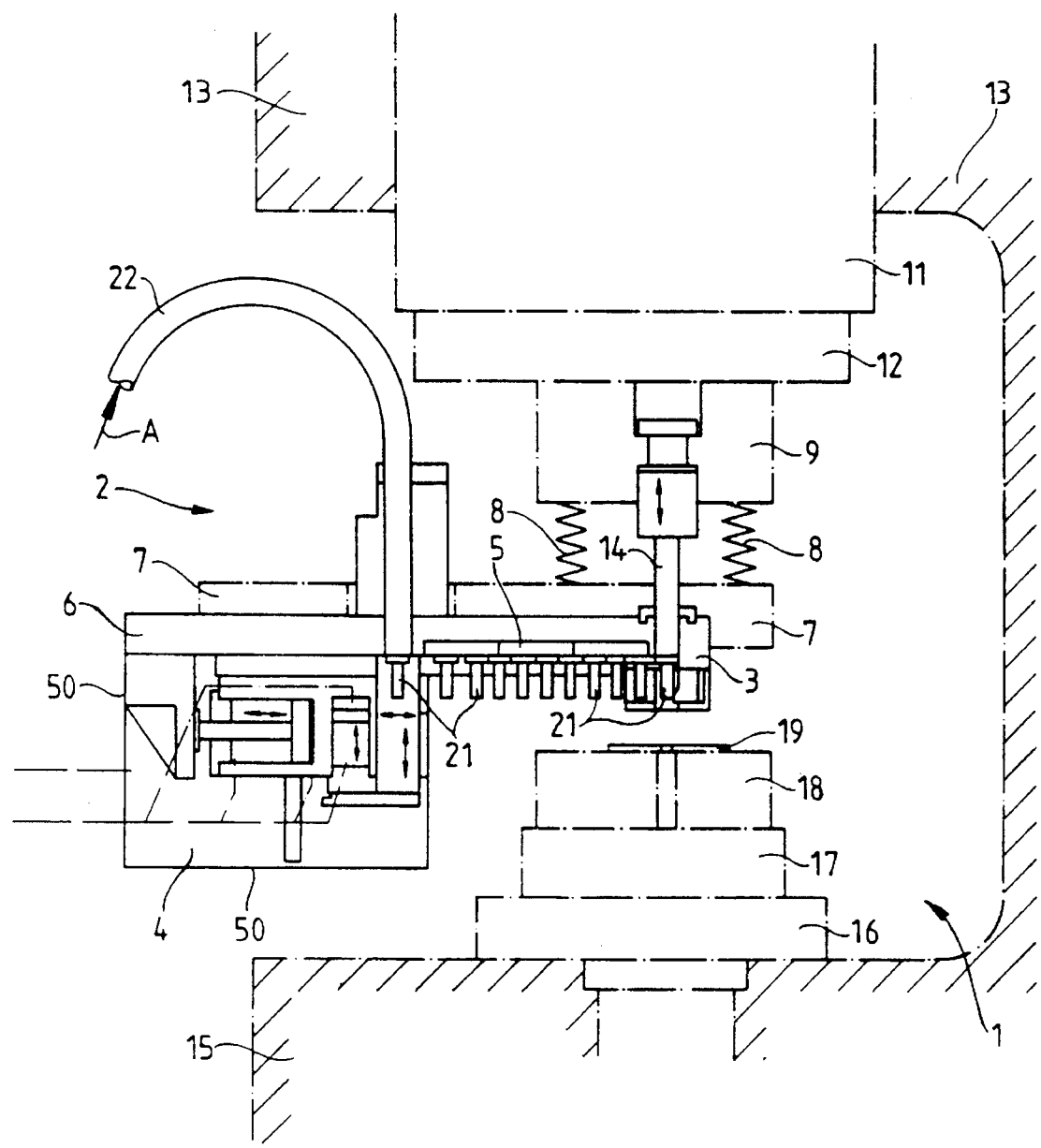
FIG. 1 shows, in a diagrammatic front view, the fastening device of the invention mounted as structural unit on the press part carrying out the stroke movements.

The inventive fastening device 2 which is suitable for installation in an ordinary press 1, consists, as shown in FIG. 1, essentially of a punch head 3, a loading device 4, and a conveyor path 5 which connects said two parts. The fastening device which forms a structural unit in the embodiment shown is held together in its said three essential parts by a supporting or mounting plate 6 which is fastened on the holding-down device 7 of the press or at least partially recessed in it. The holding-down device 7 is fastened, spaced via springs 8, to a stamp-holding plate 9 which, in its turn, is connected to a head plate 12 which is mounted on the press ram 11; the press ram 11 is guided in customary manner in the press housing 13.

Within the punch head 3 there is guided a pressing-in ram 14 which passes through the holding-down device 7 with slide guidance or play and is anchored in the stamp-holding plate at its upper end facing away from the punch head.

Below the punch head 3 there is an ordinary press table structure with a clamping plate 16 fastened to the press table, said plate bearing an intermediate plate 17 on which, in the embodiment shown, a cutting insert 18 is fastened as counter tool. The sheet 19 which is to be shaped and to be provided with one or more screws 21 lies on the cutting insert When mention is made here of a "sheet", this includes both endless sheet bars fed from a coil which are subjected to stepwise deformations in various sequential steps and are then provided at given places simultaneously during the deforming step with screws, as well as plates or the like. The expression "screw" in the present case means any type of bolt-shaped element which has a head.

The screws 21 which are to be fastened to the sheet 19 are fed in the direction indicated by the arrow A to the loading device 4 via a tube 22, preferably from a known, pneumatically acting, so-called shooting station (not shown), in front of which a sorting device is provided. The screws 21 are individually "shot" into the loading device 2, which will be described in further detail below. In a manner which will also be described in further detail below, the screws 21 pass from the loading device 4 via the conveyor path 5 into the punch head 3 which then, in loaded condition, is lowered with the holding-down device 7 together with the conveyor path 5 and the loading device as structural until striking against the sheet 19, whereupon, by further lowering of the press ram 11, the pressing-in ram 14 is pushed through the punch head with screw 21 present in front of the ram head, with compression of the springs 8, the screw 21 being thus driven into the sheet 19 and fastened to it in known manner.

In order to be able to keep the tube 22 in all cases free of bending, at least in the region close to the loading device 4, the tube can be fastened, in the embodiment shown in FIG. 1, by a holding plate (not shown) which is fastened to the head plate 12.

In the embodiment shown in FIG. 2, the essential parts are identical to those of the embodiment of FIG. 1, so that the same reference numerals are used for said parts, and only the differences between the two versions will be described below.

In this second embodiment, the fastening device of the invention is fastened as a structural unit with its individual units mounted on the supporting or mounting plate 6, namely punch head 3, loading device 4, and conveyor path 5, in position swung 180° from the position shown in FIG. 1, via the supporting or mounting plate 6 on the lower stationary part of the press, namely in the region of the cutting insert 18. Structure and operation are fundamentally the same as in the embodiment shown in FIG. 1, with the difference that the structural unit 3, 4, 5, 6 remains in relative rest with respect to the bed plate during the stamping and fastening process, while the movement of the pressing-in ram 14 is again effected by the movable upper part of the press, via a driver 23 which is connected with the head plate 12 and is moved back and forth vertically in accordance with the movements, of the press ram as indicated by the arrow B, and with its free end acts in such a manner on a transfer device 24 that the latter carries out a horizontal backward and forward movement as indicated by the arrow C, which movement it then transfers with further change in direction to the pressing-in ram 14 so that, with this drive combination, the vertical backward and forward movements of the press ram 11 are converted by double reversal in direction by 90° into vertical downward movements of the pressing-in ram 14 which are directed opposite the movement of the press ram, i.e. the downward movement of the press ram 11 effects an upward-directed movement and back on the part of the pressing-in ram 14 and vice versa.

If, thus, the holding-down device 7, together with the stamp-holding plate 9 and the head plate 12, move downward, due to the movement of the press ram, until striking against the sheet 19, and the press ram 11, head plate 12 and stamp-holding plate 9 then move further downward against the springs 8, the last-mentioned part of the movement is so transmitted to the pressing-in ram 14 that the latter moves to the same extent upward carrying along a screw 21, the shank of which it then presses through the sheet and fastens it thereon in known manner.

Figure 2:
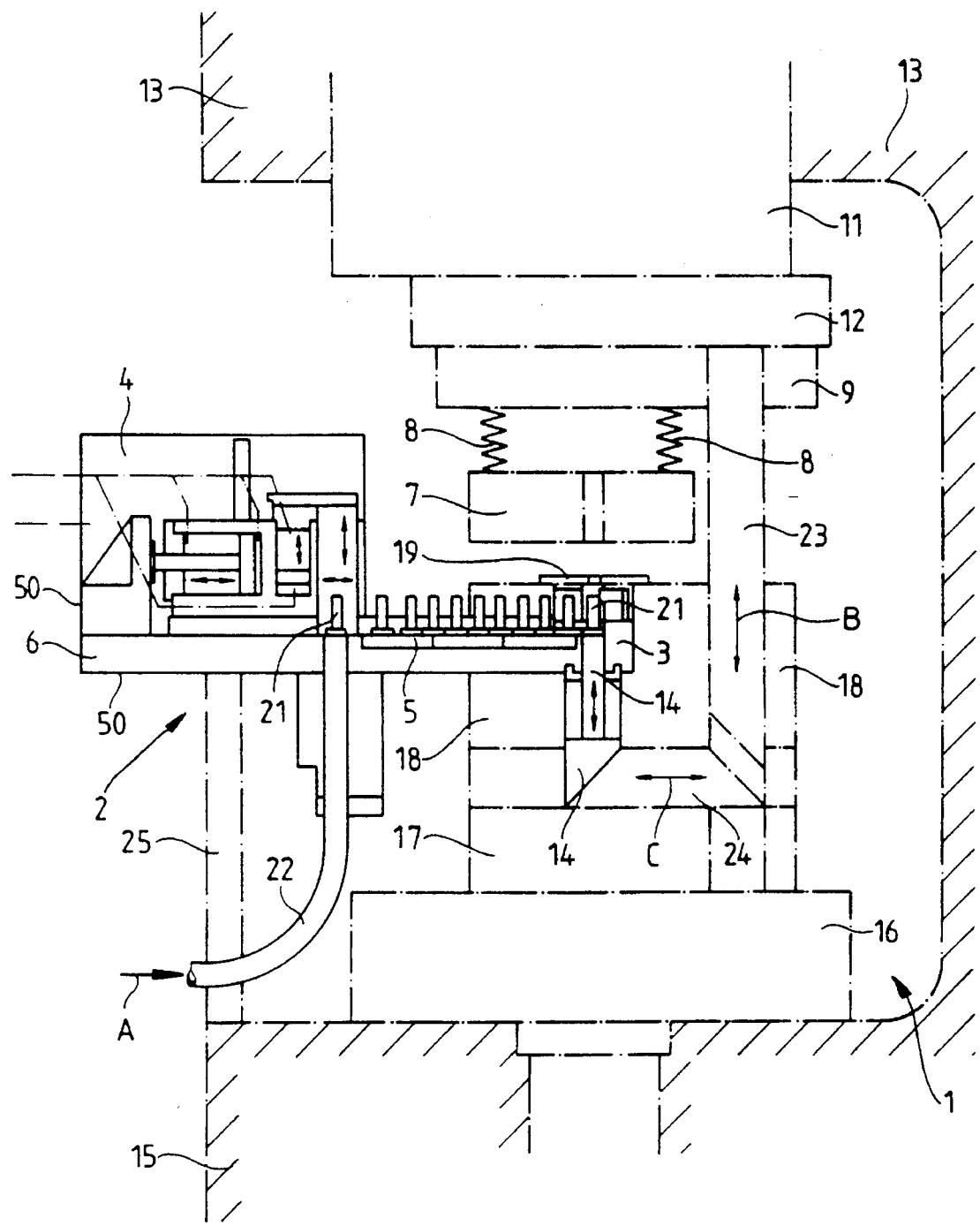
FIG. 2 shows the same fastening device mounted as structural unit on the counteracting, fixed press part, with advance of the ram initiated by the moving press part.

As can furthermore be noted from FIG. 2, in this embodiment the holding-down device 7 is made narrower, since it does not perform here the supporting function for the fastening device. For this, a support 25 fastened to the press table is provided, the free end of which is connected with the supporting or mounting plate 6 and thus supports the structural unit 3, 4, 5.

Details of the fastening device of the invention will now be explained with reference to FIG. 3 and the corresponding sectional views of FIGS. 3A, 3B and 3C. One of the main part of this structural unit is the loading bushing 26 which, due to the construction described below, carries out the movements which are symbolized by the vertical double-ended arrow D and the horizontal double-ended arrow E. For this purpose, the vertical surface of the loading bushing 26 lying to the left of the drawing is guided vertically on the end surface of a carriage 27 which can carry out horizontal backward and forward movements, as indicated by the double-ended arrow F. This is obtained in the manner that the carriage 27 is suspended on the top, as shown in FIG. 3B from a T-slot or T-ledge 28 which is connected to the supporting or mounting plate 6. On the end facing away from the loading bushing 26, a cylinder bore 29 is provided in the carriage 27, said bore being closed by a cover 31 and a piston 32 being mounted in it for horizontal backward and forward movement, the piston rod 33 of which passes outward through the cover 31, its free end being fastened on an abutment 34 supported by supporting or mounting plate 6. This cylinder-piston unit 29, 32, 33 (hereinafter called the "feed cylinder") is double-acting and is connected accordingly with two feed lines 35 and 36, the feed line 35 debouching in the cylinder 29 in front of the piston 32, i.e. on the side of the piston facing away from the piston rod, while the line 36 extends into the cylinder 29 on the piston-rod side so that, with pneumatic or hydraulic pressure action on the line 35, due to the stationary connection of the piston rod with the abutment 34, the carriage 27, together with loading bushing 26, carries out a movement to the right, namely by a precisely measured distance which results from the striking of the cover 31 against the piston surface on the piston-rod side which then takes place. This end position is shown in dashed line in FIG. 3.

In the region of the carriage between the loading bushing and the feed cylinder 29, 32, 33, there is another piston-cylinder unit, which is also double-acting, (hereinafter called the "positioning cylinder"), which is formed by a vertical cylinder bore 37 in the carriage 27 with piston 38 movable vertically therein and corresponding piston rod 39. In this case, the piston 38, together with its piston rod 39, is movable upon corresponding action by pressure, while the cylinder bore 37 is vertically stationary. The positioning cylinder 37, 38, 39 effects the vertical movements of the loading bushing as indicated by the double-ended arrow D, in the manner that the end of the piston rod 39 facing away from the piston 38 is firmly attached to a with carrier 41 which extends horizontally up into the region below the loading bushing and is bolted on its part to the loading bushing 26.

On the bottom of the carriage 27 there are furthermore also arranged, spaced apart vertically, two initiators 42 and 43 which cooperate with the loading-bushing carrier 41 in such a manner that they indicate the loading-bushing end positions at the time, the initiator 42 namely indicating the upper end position and the initiator 43 the lower one, which is indicated symbolically in dashed line in the drawing.

The upward and downward movement of the piston 38 together with its piston rod 39, and thus of the loading bushing 26, is made possible by hydraulic or pneumatic lines 44 and 45, the line 44 terminating in the cylinder space lying above the piston 38, while the line 45 debouches on the piston-rod side of the piston 38 into the cylinder bore 37. If, now, the line 44 is acted on by pressure in the position shown, this results in a lowering of the loading bushing 26, while the action of pressure on the line 45 leads to a lifting of the loading bushing 26.

An exact positioning of the loading bushing 26 in the corresponding positions is obtained by the end stops which have been explained above for the two cylinder-piston units, in which connection, in the position shown, i.e. moved to the top left, the loading bushing 26 has on top a receiving chamber 46 which is open on top and into which one screw 21 can pass in each case, preferably by means of the aforementioned pneumatic "shot".

As soon as the loading bushing 26 is loaded with a screw 21, it is moved by corresponding action (described above) on the feed cylinder 29, 32, 33 to the right until impact of the piston, its free front side striking against the head of the screw 21 suspended at the left, spaced somewhat from the rest of the row of screws. The said spacing will be understood immediately in connection with the further movements of the loading bushing. The screws 21 shown to the right of the loading bushing 26 are already in the region of the conveyor path of the invention which consists here of a plurality of aligned magnets 47 which hold the screws 21 by their heads at precisely the desired height. The magnets 47 are contained in the manner which can be noted from FIG. 3C, in the supporting or mounting plate 6, which, in its turn, is fastened, in part recessed, on the holding-down device in the manner which can also be noted from FIG. 3C. From FIG. 3C there can also be noted the downwardly open T-guide or T-slot 48 in the form of a correspondingly recessed ledge below the magnets 47, it serving in particular as overhead guide of the overhead system for the event of the use of non-magnetizable elements.

As already mentioned, the screws 21 are "shot" individually into the loading bushing 26, for which purpose, in the embodiment shown, a special connection of the tube 22 is provided. Precisely above the position of the outlet of the loading bushing 26 shown in FIG. 6, there is fastened, in coaxial alignment, a coupling receiver 49 which is fastened to the supporting or mounting plate 6 and passes through the holding-down device 7, the inside diameter of said coupling receiver guaranteeing an undisturbed but guided sliding through of the screws. The coupling 51 proper is placed on the coupling receiver 49, and the two are connected together in some suitable manner. The coupling 51 is pushed, firmly adhering, over the end of the tube 22 so that the channel 52 formed by the tube and adapted in its dimensions also to the screw head extends without transition up into the receiving chamber 46. Above the coupling 51 there is a ring initiator 53 which surrounds the tube 22 and records each passing screw 21 in the manner already described.

Figure 3:
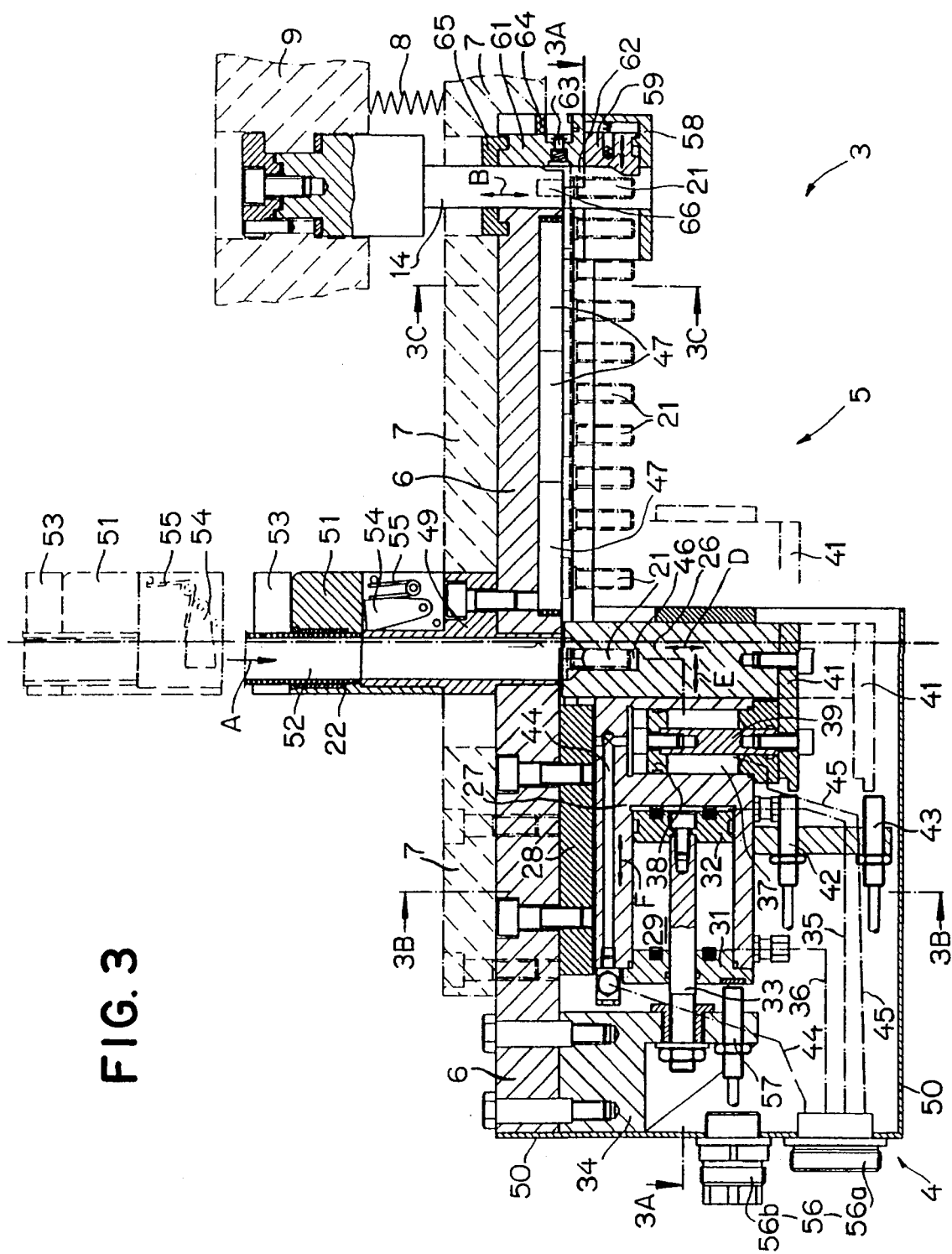
FIG. 3 is a detail view of the fastening device, partially in section.

As the dashed line showing above the ring initiator 53 in FIG. 3 indicates, the coupling bears a barrier in the form of a flap 55, which is swingably mounted laterally alongside the channel on a shaft and which, under the influence of a spring 55, is pressed to the left from the outside against the wall of the coupling receiver 49 so that, upon the loosening of the coupling 51, as shown in dashed line on the top of FIG. 3, it snaps into the channel 52, with the result that even in the event of an unintended "shot", a screw can in no case leave the tube 22, so that effective protection for personnel and machinery is thereby obtained.

As is clear from the above remarks, only a connection of the tube 22 which can be effected by a few turns of the hand is necessary in order to begin the loading, in which connection it should also be mentioned that the compact manner of construction and disturbance-free operation of the loading device 4, protected substantially from external influences, are also favored by the fact that said device is covered, except for the region facing the punch head 4 and the conveyor path 5, by a housing 50 which is provided on its outside with a multi-function plug 56 via which both the hydraulic or pneumatic lies 35, 36, 44 and 45 are to be fed (56a) as well as the electrical connection 56b obtained.

After the loading of the loading bushing 26, the feed cylinder is acted on by pressure via the line 35 by suitable initiator control or the like so that the carriage 27, together with the loading bushing 26, moves to the right up to the end feed position shown in dashed line, in which the screw 21 present in the receiving chamber 46 passes into the position shown to the right in FIG. 3 alongside the loading bushing 26, i.e. assumes a distance equal to the wall thickness of the loading bushing from the next screw in the row. By the pressure action of the positioning cylinder via the line 44 the loading bushing is now moved in the advanced position to its lower position, as shown in dashed line in FIG. 3 in the withdrawn position at the height of the initiator 43, opposite the carriage 27, as a result of which the top edge of the loading bushing passes below the screw 21 which "adheres" to the magnet guide 47. By pressure actuation of the feed cylinder via the line 36, there takes place the return of the carriage 27 with the loading bushing 26 present in the lower position, which loading bushing 26, (upon reaching the rear position which is reported by an initiator 57, which is also fastened to the abutment 34 below the piston rod 33, is again lifted into the upper loading position shown in FIG. 3 by pressure actuation of the positioning cylinder via the line 45 and is then available for another loading. This process is then repeated in synchronism with the operation of the punch head, in which connection, upon each advance of the loading bushing with the transfer in each case of one screw 21 to the magnetic conveyor path 47, the last screw 21 in each case is brought into contact with the next to the last, so that a row of screws 21 lying head against head is produced which, upon each conveyance step of the loading bushing, is displaced to the right by an amount precisely equal to the diameter, so that then the aforementioned exact positioning of in each case one screw 21 in the punch head which is necessary for the setting process is definitely obtained without the necessity of further deflection or positioning. The rigid head feed of the elements in their position in a row resting against each other up to the punch head can clearly be noted also from FIG. 3A.

The punch head 3 is basically known as such and its installation and actuation have already been explained with reference to FIGS. 1 and 2. On the basis of FIG. 3, a few further details may be pointed out, thus, for instance, the spring-loaded pushers 59 which can be noted therein and which are arranged 120° apart in the punch-head lower part 58 as additional assurance, the function of which pushers has already been described above. Furthermore, it can be noted from FIG. 3 that, in the upper part 61 of the punch head 3, at the height of the plane of the heads of the screws 21 a pin 63 which extends into the ram channel 62 is contained in the wall on the side opposite the conveyor path, which pin, as shown in FIG. 3, with the punch head duly loaded with a screw 21, is pressed against the spring force into the wall of the upper part 61 of the punch head and thereby activates an initiator 64 for the indicating of proper loading.

On the top there is provided in the supporting or mounting plate 6 a centering ring 65 which extends around the ram 14 up to which ring the end of the pressing-in ram 14 fastened in the stamp-holding plate 9 can be lowered with compression of the springs 8 by the holding-down device. Into the head of the ram 14 there is introduced at least one magnet 66 for the taking-over and holding of the screw 21 which is conducted in each case into the ram channel 62.

Figure 3A:
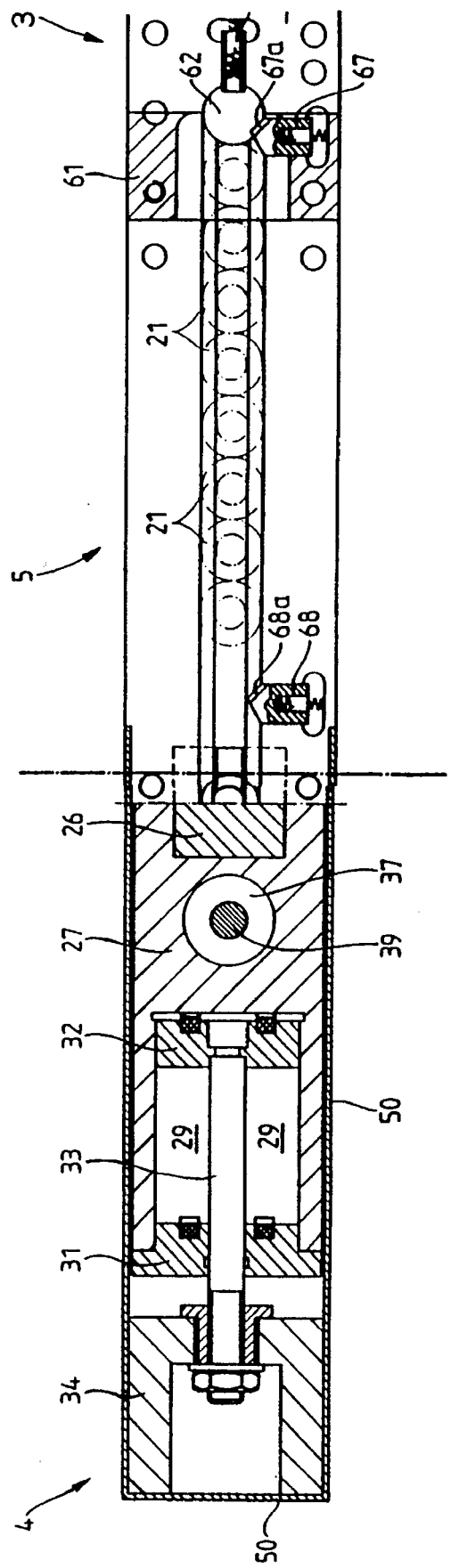
FIG. 3A is a section along the line A—A of FIG. 3.
Figure 3B:
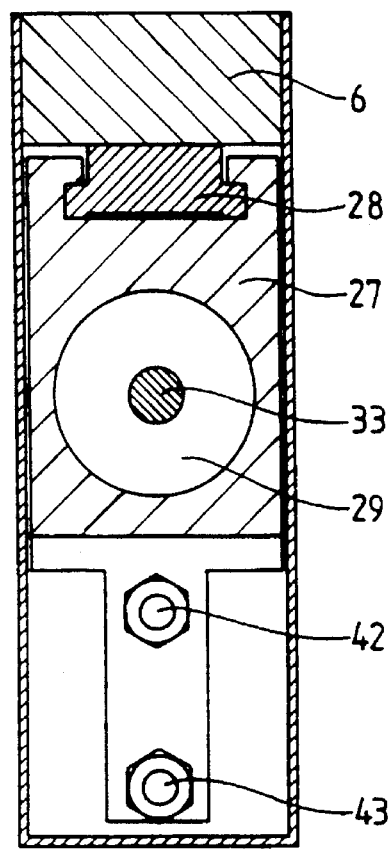
FIG. 3B is a section along the line B—B of FIG. 3.
Figure 3C:
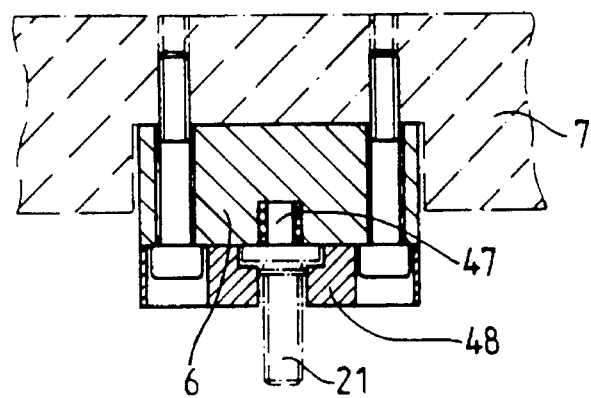
FIG. 3C is a section along the line C—C of FIG. 3.

FIG. 3A shows very clearly the row of screws present in the region of the conveyor path 5, as well as a spring-loaded pawl 67 which is also arranged at the height of the pin 63 or of the plane of the heads of the row of screws in the upper part 61, extending laterally into the ram channel 62. The function of the pawl for the snug application of each screw 21 against the inner wall of the ram channel 62 has already been described in detail, it being furthermore pointed out in the present connection that the oblique surface provided in the case of non-magnetizable screws, over which the screw 21 just present in the ram channel 62 is pressed against the head of the ram 14, is designated 67a in FIG. 3A. In the position of the pawl 67 shown, the ram channel 62 is not loaded, so that the pawl 67 extends relatively far into the channel 62.

The similarly constructed pawl 68 which is shown in the left-hand region of the conveyor path 5 and which is equipped with a corresponding oblique surface 68a for non-magnetizable screws 21 is a precautionary measure which serves for additional assurance since the positive feed of the invention by itself already guarantees the advance in proper position of the screws up into the ram channel.

Figure 4:
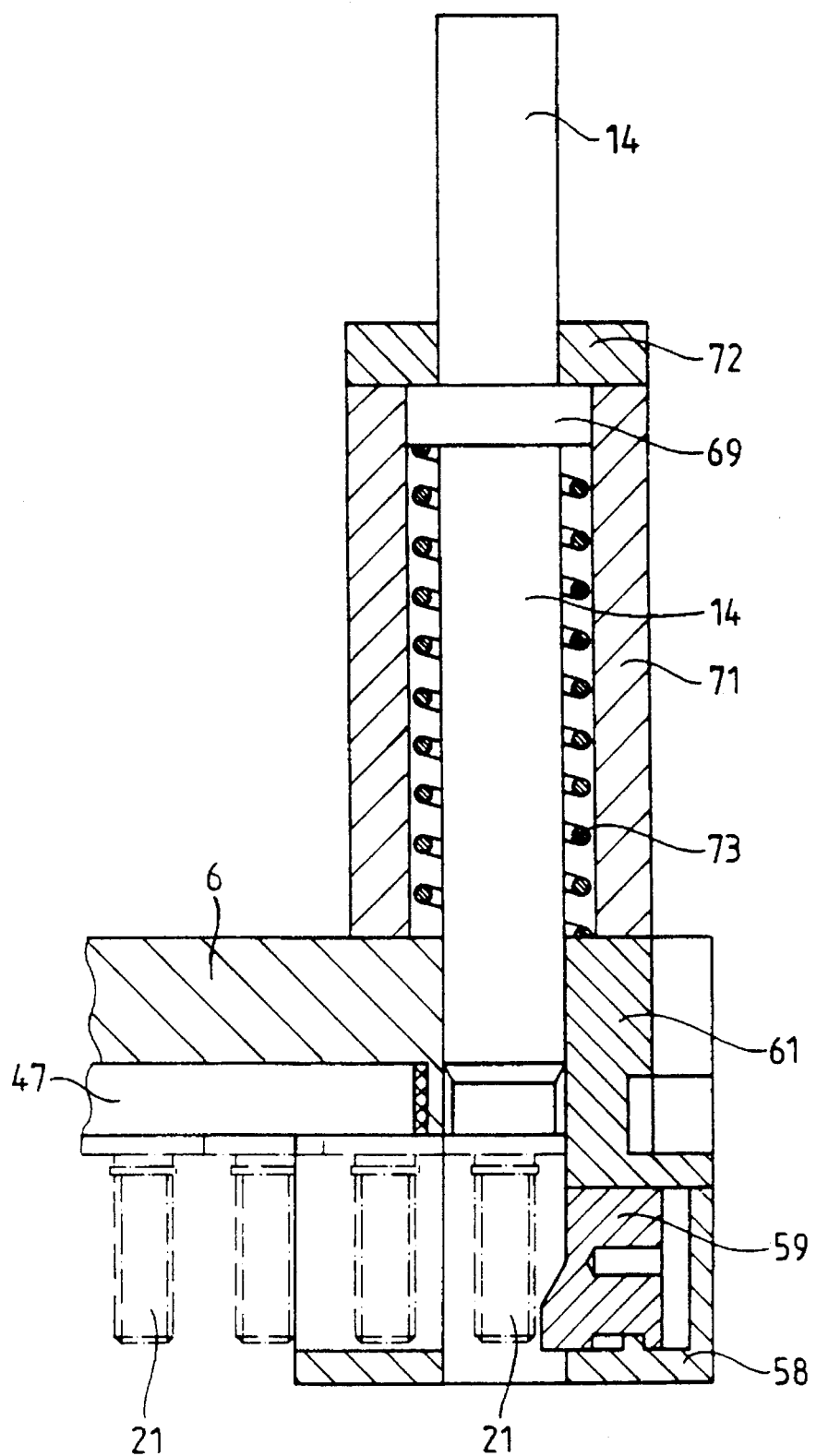
FIG. 4 shows the so-called plunger version.

On the basis of FIG. 4 there will finally be explained the plunger version already mentioned with respect to its preferred use. In this development of the punch head 3 the ram 14 is guided via a collar in a sleeve 71 which is closed on top by a cover 72 which, while it centrally has a corresponding hole for the passage of the free ram end which is lengthened beyond the collar 69 forms however, on the inside, an end stop for the collar 69 and thus also for the pressing-in ram 14 in its uppermost position in which the ram head is flush with the magnet feed 47 for the smooth reception of the screws 21. In the position shown, the ram 14 is in this uppermost position, namely under the action of a compression spring 73 which rests at the bottom against the top of the supporting or mounting plate 6 and at the top against the bottom of the collar 69 the top side of which rests on the cover 72. With this version the upper precise end position of the ram 14 is assured independently of the setting of the pressing-in ram, so that this version can be used, for instance, for crank presses.

Within the scope of the invention, modifications of the embodiments described and shown are, of course, possible. Thus, for instance, several punch head heads 3 and ram channel 62 can be provided in a structural unit 2 without having to give up the character of a single structural unit. On the other hand, it is also possible with only one conveyor path 5 to supply several, and preferably two, ram channels 62, in which case, a parallel feed is recommended, which even permits the feeding of screws of different size.

Industrial Utility

By the invention, a fastening of bolt-shaped elements, particularly screws, to a sheet or plate is obtained which, due to its considerable advantages, particularly with respect to its handling possibilities as a single unit and it reliability, not only satisfies safety requirements but, in its functionality and at the same time high degree of economy, permits diversified and wide use in the pertinent technical field.

I claim:

1. A punch head, mountable (7,9,12;16,17,18) in a press, for the attachment of bolts (21) to a sheet material, with each bolt having a head and a bolt-shaft, said punch head comprising:
   a. a ram (14);
   b. a rigid feed chute (5) in which the bolts are aligned in a lateral head-against-head queue and, via which feed chute, the bolts are fed in said head-against-head queue, from a loading device (4) having a loading bushing (26), to said ram of punch head (3);
   c. a receiving chamber (46) in said loading bushing (26) which chamber is adapted to receive the bolts (21) individually in a fixed aligned orientation, to align the bolts (21) in said feed chute and to advance said bolts (21) in said feed chute in a chute axis perpendicular to an axis of the ram (14),
       said loading bushing (26) adapted to perform a first reciprocating motion in said chute axis, with said motion including an advance stroke for advancing the bolts (21) in said feed chute (5), and a return stroke, and a second reciprocating movement, parallel to the axis of the ram, and
   wherein the punch head (3) forms a structural unit which can be handled independently of the press and which can be mounted in the press as a unit.

2. The punch head according to claim 1, wherein the feed chute (5) is provided on an upper portion thereof with magnets (47) on which the heads of the bolts (21) are held.

3. The punch head according to claim 1, wherein the feed chute (5) is configured as a T-slot feed.

4. The punch head of claim 3, wherein the T-slot feed is open towards the bottom.

5. The punch head according to claim 1, wherein a carriage (27) is provided for guiding of the loading bushing (26).

6. The punch head according to claim 1, wherein the loading bushing (26) is cylinder-actuated.

7. The punch head of claim 6, wherein the cylinder-actuated loading bushing comprises at least one first piston-cylinder unit (29, 32, 33) for an advance stroke, and at least one second piston-cylinder unit (37, 38, 39) for a positioning stroke.

8. The punch head according to claim 7, wherein the piston-cylinder units (29, 32, 33; 37, 38, 39) which move the loading bushing (26) are double acting piston-cylinder units.

9. The punch head according to claim 7, wherein the first piston-cylinder unit (29, 32, 33), together with a piston rod (33) is supported, fixed in position, by an abutment (34) held on a supporting plate (6), while the first piston-cylinder unit (29) is contained in a carriage (27) which bears the loading bushing (26).

10. The punch head according to claim 7, wherein the second piston-cylinder unit together with a piston rod (39) is connected via a carrier (41) with the loading bushing (26) which is guided on a carriage (27) perpendicular to its direction of movement (F), while the second-piston cylinder unit (37) is contained in the carriage (27).

11. The punch head according to claim 1, wherein there is provided a coupling receiver (49) which is aligned with one of the loading bushing (26) and the receiving chamber (46) in a receiving position and connected, via a supporting plate (6) with a housing (50), the receiver having a passage, corresponding to the diameter of the head of the bolts (21), for the detachable reception of a coupling (51) for a bolt individual feed, which also provides a passage (52) of the same diameter.

12. The punch head according to claim 1, wherein at least one of the loading bushing (26) and the receiving chamber (46) is provided with a clamping device which prevents the bolts (21) from dropping out.

13. The punch head according to claim 1, wherein the punch head (3) has a ram channel (62) which is contained, at least in part, in a supporting plate (6).

14. The punch head according to claim 13, wherein there is provided, at the height of the plane of the heads of the bolts (21), a spring-loaded pin (63) which extends into a ram channel (62) on the side facing away from the feed chute (5) and which pin activates an initiator (64).

15. The punch head according to claim 13, wherein there is provided at least one spring-loaded pawl (67,68) in the feed chute (5) at the height of the heads of the bolts (21) which are conveyed in the ram channel (62).

16. The punch head according to claim 1, wherein the ram (14) bears at least one magnet (66) on a free end thereof.

17. The punch head according to claim 1, wherein the ram (14) of the punch head (3) is operable as a plunger, acted on by a compression spring.

* * * * *